United States Patent Office 3,240,702
Patented Mar. 15, 1966

3,240,702
METHOD OF BREAKING EMULSION
Roger F. Monroe, Midland, Mich., assignor to The Dow Chemical Company, Midland, Mich., a corporation of Delaware
No Drawing. Filed Nov. 14, 1962, Ser. No. 237,747
7 Claims. (Cl. 252—8.55)

The invention is concerned with an improved way of preventing the formation of a liquid emulsion and of separating an emulsion into distinct liquid phases.

An emulsion may be defined as a heterogeneous liquid mixture, usually largely of two liquid phases in which one liquid (the discontinuous phase) forms droplets microscopically suspended in the other liquid (the continuous phase).

In a number of industrial operations, immiscible liquids have been or are brought into contact with one another, e.g., petroleum production, transportation, refining, blending, and treatment wherein oil and water become so intermixed that an emulsion forms which stubbornly resists efforts to demulsify it, e.g. to separate the oil and water into distinct phases. Demulsification is often spoken of as breaking the emulsion. Although emulsions are desirable in a number of operations, they are often troublesome and sometimes hazardous. They are troublesome because the emulsions resist movement, prevent proper processing, require delayed and costly treatment, and entail handling of unwanted quantities of material, e.g., water. They are hazardous because the emulsion often necessitates unsafe pressures for movement and particularly because when adequate heat is provided for processing petroleum of an emulsion, the water is converted to steam which erupts, often violently and sometimes with devastating results. Numerous efforts have been made to prevent emulsification or to break emulsions, particularly petroleum and water or brine emulsions. A number of such efforts have met with success in varying degrees. Such efforts have largely entailed the employment of a demulsifying agent which is added either to one of the liquids prior to contacting the other or to the emulsion formed after contact to reduce the surface tension of one or more of the liquids and permit the entrapped discontinuous phase liquid of the emulsion to flow together, i.e., coalesce, and subsequently rise or settle, as the case may be, dependent on the difference in density of the liquids comprising the emulsion.

Selection of a siutable demulsifying agent (demulsifier) is difficult. Whether or not a particular additament will effectuate demulsification of an emulsion is not reliably predictable. Even though some demulsification ensues when some materials are added to an emulsion, the presence of the additament sometimes adversely affects other properties of the emulsion or the resulting separated phases. Availability, safety, and convenience are other factors which must be weighed before using any additament for the purpose of demulsification. A fully satisfactory demulsifier has not yet been suggested.

A need, therefore, exists for a method of demulsification employing a more effective, available, and safe additament which does not adversely affect the properties of an emulsion or the resulting separate liquid phases, and particularly for a method of demulsifying (breaking) a water-in-oil emulsion.

I have discovered a method of resolving substantially immiscible liquids which tend to form emulsions, when in intimate contact with each other, into distinct liquid phases. The term "resolving" as used herein includes both the prevention of the formation of an emulsion by admixing the demulsifier with either one or both of the liquids prior to such contact or with the resulting emulsion formed after intimate contact. The invention, accordingly, comprises admixing a ketal compound in an amount of between about 0.1 and 1.5 parts, and preferably between 0.2 and 1.0 part, per 100 parts by weight of either one or both liquids, which tend to form emulsions when in intimate contact, prior to such contact, or to the resulting emulsion after such contact.

Demulsification according to the invention is usually carried out by admixing a suitable amount of the cyclic ketal compound with an emulsion already formed as, for example, an emulsion in a tank, pipe line, or subterranean formation, or by admixing it with an aqueous treating liquid, e.g., an hydraulic fracturing liquid or a 0.2 to 15.0 percent by weight aqueous hydrochloric acid well-acidizing liquid prior to injecting the aqueous liquid down the well penetrating a formation.

A given amount of the demulsifier employed in the invention is more effective when added to one of the liquids prior to its being brought into contact with an emulsion-prone liquid than when employed to break an emulsion already formed. Accordingly, the amount of demulsifier recommended is within the same range, whether based upon the weight of only one of the liquids when added to prevent the emulsion or based on the greater weight of the emulsion already formed.

Illustrative of methods of preparing a 1,3-dioxepin compound for use in the practice of the invention are:

(1) Reacting 2-butene-1,4-diol with a dialkoxyalkane, e.g., an acetal or ketal, in the presence of an acid catalyst at between about 20° and about 100° C., room temperature (e.g., 18° to 25° C.) being quite satisfactory;

(2) Reacting 2-butene-1,4-diol with an acetylenic compound in the presence of a mercury-containing catalyst, e.g., HgO or HgO and $BF_3$, at between about 20° and 100° C., room temperature being quite satisfactory.

The reactants are preferably employed in a mole proportion of the dialkoxyalkane to the diol of between 1.5 and 2.

Illustrative of 1,3-dioxepin compounds useful in the practice of the invention are the 1,3-dioxepin compounds, e.g., 2,2 - dimethyl - 4,7 - dihydro - 1,3 - dioxepin; 2-ethyl-2 - methyl - 4,7 - dihydro - 1,3 - dioxepin; 2-methyl-2-propyl - 4,7 - dihydro - 1,3 - dioxepin; 2-methyl-4,7-dihydro-1,3-dioxepin; and 4,7-dihydro-1,3-dioxepin. Other ketal compounds useful in the practice of the invention are 7,12 - dioxaspiro - (5,6) - dodec - 9 - ene; 1,3,3,4,6,6-hexamethyl - 2,5,7 - trioxabicyclo - (2,2,1)heptane; and ¹8,8,11,11-tetramethyl-7,12-dioxaspiro-(5,6)-dodec-9-ene.

A procedure for use in preparing a 1,3-dioxepin cyclic ketal is illustrated below.

854 grams (8 moles) of 2,2-methoxy propane and 352 grams (4 moles) of 2-butene-1,4-diol are placed in a 2-liter distillation flask, equipped with a 30-inch packed column, and heated at atmospheric pressure. At 54° C., reaction product beings to distil over. At 100° C., 700 milliliters had distilled over. Thereafter distillation under a partial vacuum of about 145 millimeters of mercury completed at about 94° C. 363 grams of the product: 2,2 - dimethyl - 4,7 - dihydro - 1,3- dioxepin were thus made. It is a clear liquid having the following properties:

Refractive index (25D) 1.4454
Density at 25° C. of 0.983 grams/cc.
Boils at 43.5° C. at 6.5 millimeters of mercury pressure.
Boils at 100° C. at 193 millimeters of mercury pressure.

To demonstrate the efficacy of the cyclic ketal employed as a demulsifier according to the invention, the following test procedure was followed:

50 parts by volume of either water or acid (as specified in the table, infra), were placed in a bottle having a volume of about 100 milliliters. The amount of each emulsifier, as hereinafter set out in the table, was then added to the acid or water in the bottle. Thereafter 50 parts by volume of a crude petroleum were added to the contents of the bottle. It was then capped and shaken vigorously for 15 seconds. The acid and oil phases were thus thoroughly intermixed. The bottle containing the sample was then allowed to stand and the extent to which the oil and water phases separated upon standing was determined, in percent by volume of the emulsion, after a measured time interval. The extent of the separation into phases is designated in the table as percent breakout. For example, a complete separation into phases is designated as a 100 percent breakout.

A series of examples was run, following the procedure set out above wherein varying amounts of the cyclic ketal were employed. The crude petroleum employed was that obtained from the Mid-Continent area which had presented especially severe emulsion difficulties.

The results obtained in the examples, the concentration, in parts by volume, based on the total volume of aqueous liquid, of the cyclic ketal compounds and aqueous media employed, together with the time interval between shaking the mixture and observed breakout, and the percent breakout are all shown in the table below:

| Ex. | Concentration Cyclic Ketal Compound in Parts by Volume | Aqueous Media | Time Interval in Minutes | Breakout in Percent |
|---|---|---|---|---|
| 1 | a 0.25 | Fresh water | 30 | 40 |
| 2 | a 0.1 | do | 30 | 2 |
| 3 | a 0.25 | Spent acid e | 30 | 30 |
| 4 | a 0.1 | do.e | 30 | 2 |
| 5 | b 0.25 | Fresh water | 30 | 42 |
| 6 | b 0.1 | do | 30 | 2 |
| 7 | b 0.25 | Spent acid e | 30 | 29 |
| 8 | b 0.1 | do.e | 30 | 2 |
| 9 | c 0.25 | Fresh water | 30 | 39 |
| 10 | c 0.1 | do | 30 | 1 |
| 11 | c 0.25 | Spent acid e | 30 | 30 |
| 12 | c 0.1 | do.e | 30 | 1 |
| 13 | d 0.25 | Fresh water | 30 | 39 |
| 14 | d 0.1 | do | 30 | 40 |
| 15 | d 0.25 | Spent acid e | 30 | 40 |
| 16 | d 0.1 | do.e | 30 | 35 | a 2,2-dimethyl-4,7-dihydro-1,3-dioxepin.
b 2-ethyl-2-methyl-4,7-dihydro-1,3-dioxepin.
c Mixture of (a) and (b).
d Mixture of (a) and 2-methyl-2-propyl-4,7-dihydro-1,3-dioxepin.
e The acid recovered from a well-acidizing treatment employing 15% by weight hydrochloric acid.

Reference to the table shows that when as much as 0.25 percent, by weight of the cyclic ketal, as illustrated by the 1,3-dioxepin compound was employed in the method of the invention, to inhibit formation of an emulsion between an aqueous liquid and a most emulsion-prone crude oil, not less than about 30% of the liquids so treated separated into oil and aqueous phase upon standing. When only 0.1 percent of the 1,3-dioxepin compound was employed, some phase separation resulted but was not sufficient for practical purposes when employed to prevent or break emulsions of aqueous liquid and oil wherein the oil is especially inclined to form tight emulsions. In such instances, at least about 0.2 percent of the demulsifier should be used. Although no more than about 40% of the emulsion was separated into distinct phases in the examples shown in this table, this extent of separation is a very worthwhile achievement when dealing with an emulsion comprising the emulsion-prone petroleum of the nature of that employed in the examples. The petroleum phase of such emulsion, upon its separation from the water phase may be again treated according to the invention, if desired, to effect another oil-water separation.

Tests wherein the method of the invention was employed to prevent, inhibit, or break emulsions between crude oil normally encountered and such aqueous liquids as water, brine, and acid solutions, less than the 25 percent emulsifier, down to .1 percent based on the weight of the liquid treated, was found to be more effective than when the emulsion comprised a Mid-Continent crude of the nature of that treated to obtain the results shown in the table above.

Having described my invention, what I claim and desire to protect by Letters Patent is:

1. The method of resolving an emulsion of emulsified immiscible aqueous and oil liquids into distinct aqueous and oil phases which comprises admixing with said emulsion between about 0.1 and 1.5 percent by weight of said emulsion of a cyclic ketal compound selected from the class consisting of 2,2-dimethyl-4,7-dihydro-1,3-dioxepin; 2-ethyl-2-methyl-4,7-dihydro - 1,3 - dioxepin; 2-methyl-2-propyl-4,7-dihydro-1,3-dioxepin; 2-methyl - 4,7 - dihydro-1,3-dioxepin; 4,7-dihydro-1,3-dioxepin; 7,12-dioxaspiro-(5,6)-dodec-9-ene; 1,3,3,4,6,6-hexamethyl - 2,5,7 - trioxabicyclo-(2,2,1) heptane; and 8,8,11,11-tetramethyl-7,12-dioxaspiro-(5,6)-dodec-9-ene.

2. A method according to claim 1, wherein the cyclic ketal is 2,2-dimethyl-4,7-dihydro-1,3-dioxepin.

3. The method of inhibiting emulsification of substantially immiscible aqueous and oil liquids which are subsequently to be brought into intimate contact with each other comprising admixing with at least one of the aqueous and oil liquids, prior to such contact, between about 0.1 and 1.5 parts by weight, based on the weight of the liquid being treated, of a cyclic ketal selected from the class consisting of 2,2-dimethyl-4,7-dihydro-1,3-dioxepin; 2-ethyl-2-methyl-4,7-dihydro - 1,3 - dioxepin; 2-methyl-2-propyl-4,7-dihydro - 1,3 - dioxepin; 2-methyl-4,7-dihydro-1,3-dioxepin; 4,7-dihydro-1,3-dioxepin; 7,12-dioxaspiro-(5,6)-dodec-9-ene; 1,3,3,4,6,6-hexamethyl - 2,5,7 - trioxabicyclo-(2,2,1) heptane; and 8,8,11,11-tetra-methyl-7,12-dioxaspiro-(5,6)-dodec-9-ene, and thereafter bringing the aqueous and oil liquids into intimate contact with each other.

4. The method of separating a substantial portion of an aqueous liquid and oil emulsion into a distinct oil phase and a distinct aqueous phase and maintaining the phases so separated comprising admixing with said emulsion, between 0.1 and 1.5 parts by weight thereof, of a cyclic ketal selected from the class consisting of 2,2-dimethyl-4,7-dihydro - 1,3 - dioxepin; 2-ethyl-2-methyl-4,7-dihydro-1,3-dioxepin; 2-methyl-2-propyl-4,7-dihydro - 1,3-dioxepin; 2-methyl-4,7-dihydro-1,3-dioxepin; 4,7-dihydro-1,3-dioxepin; 7,12-dioxaspiro-(5,6)-dodec-9-ene;; 1,3,3,4,6,6-hexamethyl - 2,5,7 - trioxabicyclo-(2,2,1)heptane; and 8,8,11,11-tetramethyl-7,12-dioxaspiro-(5,6)-dodec-9-ene.

5 In a method of fracturing an oil-bearing subterranean formation penetrated by a well by forcing an aqueous fracturing liquid into the formation at fracturing pressure, the improvement comprising admixing with the fracturing liquid prior to forcing it into the formation a demulsifying amount of a compound selected from the class consisting of 2,2-dimethyl-4,7-dihydro-1,3,-dioxepin; 2-ethyl-2-methyl - 4,7 - dihydro-1,3-dioxepin; 2-methyl-2-propyl-4,7-dihydro-1,3-dioxepin; 2-methyl - 4,7 - dihydro-1,3-dioxepin; 4,7-dihydro-1,3-dioxepin; 7-12-dioxaspiro-(5,6)-dodec-9-ene; 1,3,3,4,6,6-hexamethyl - 2,5,7 - trioxabicyclo-(2,2,1)heptane; and 8,8,11,11 - tetramethyl-7,12-dioxaspiro-(5,6)-dodec-9-ene and forcing the thus treated fracturing liquid into the formation at fracturing pressure.

6. The method of breaking an oil-water emulsion in a subterranean oil-bearing formation penetrated by a well in the vicinity of the wellbore of the well comprising injecting down the well and into contact with said emulsion an amount sufficient to break said emulsion, of a cyclic ketal selected from the class consisting of 2,2-dimethyl-4,7-dihydro - 1,3 - dioxepin; 2-ethyl-2-methyl-4,7-dihydro - 1,3 - dioxepin; 2-methyl-2-propyl-4,7-dihydro-1,3-dioxepin; 2 - methyl-4,7-dihydro - 1,3 - dioxepin; 4,7-dihydro-1,3-dioxepin; 7,12-dioxaspiro-(5,6)-dodec-9-ene; 1,3,3,4,6,6-hexamethyl - 2,5,7 - trioxabicyclo-(2,2,1)heptane; and 8,8,11,11-tetramethyl - 7,12 - dioxaspiro-(5,6)-dodec-9-ene.

7. In a method of acidizing an oil-bearing subterranean formation penetrated by a well employing an aqueous acidizing liquid the improvement comprising admixing with the acidizing liquid priod to the acidizing treatment a cyclic ketal selected from the class consisting of 2,2-dimethyl - 4,7 - dihydro-1,3-dioxepin; 2 - ethyl-2-methyl-4,7-dihydro-1,3-dioxepin; 2 - methyl-2-propyl-4,7-dihydro-1,3-dioxepin; 2-methyl - 4,7 - hydro - 1,3 - dioxepin; 4,7-dihydro-1,3-dioxepin; 7,12-dioxaspiro-(5,6)-dodec-9-ene; 1,3,3,4,6,6-hexamethyl - 2,5,7 - trioxabicyclo-(2,2,1)heptane; and 8,8,11,11-tetramethyl - 7,12 - dioxaspiro-(5,6)-dodec-9-ene in an amount between 0.1 and 1.5 parts by weight of the aqueous acidizing liquid and injecting the thus treated liquid down the well and back into the formation.

References Cited by the Examiner
UNITED STATES PATENTS

| | | | |
|---|---|---|---|
| 2,260,261 | 10/1941 | Morey | 260—338 |
| 2,278,838 | 4/1942 | De Groote et al. | 252—8.55 |
| 2,900,350 | 8/1959 | Kirkpatrick | 252—331 |
| 3,004,924 | 10/1961 | Kirkpatrick et al. | 252—344 |
| 3,116,298 | 12/1963 | Sterling et al. | 260—338 |
| 3,116,299 | 12/1963 | Sterling et al. | 260—338 |

JULIUS GREENWALD, *Primary Examiner.*